US012058672B2

(12) United States Patent
Beale et al.

(10) Patent No.: US 12,058,672 B2
(45) Date of Patent: Aug. 6, 2024

(54) COMMUNICATIONS DEVICE, INFRASTRUCTURE EQUIPMENT AND METHODS FOR THE RECEPTION OF CONTROL INFORMATION BY A COMMUNICATIONS DEVICE IN A WIRELESS COMMUNIATIONS NETWORK

(71) Applicant: Sony Group Corporation, Tokyo (JP)

(72) Inventors: Martin Warwick Beale, Basingstoke (GB); Shin Horng Wong, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 264 days.

(21) Appl. No.: 17/606,471

(22) PCT Filed: Apr. 15, 2020

(86) PCT No.: PCT/EP2020/060560
§ 371 (c)(1),
(2) Date: Oct. 26, 2021

(87) PCT Pub. No.: WO2020/224924
PCT Pub. Date: Nov. 12, 2020

(65) Prior Publication Data
US 2022/0201713 A1 Jun. 23, 2022

(30) Foreign Application Priority Data

May 3, 2019 (EP) .................................. 19172649

(51) Int. Cl.
*H04W 72/04* (2023.01)
*H04L 1/00* (2006.01)
*H04L 5/00* (2006.01)
*H04W 72/0446* (2023.01)
(Continued)

(52) U.S. Cl.
CPC ....... *H04W 72/1263* (2013.01); *H04L 1/0025* (2013.01); *H04L 5/0053* (2013.01);
(Continued)

(58) Field of Classification Search
CPC . H04W 72/1263; H04W 72/20; H04W 72/23; H04W 72/0446; H04W 72/126;
(Continued)

(56) References Cited

U.S. PATENT DOCUMENTS

2018/0124746 A1  5/2018 Choi et al.
2021/0045105 A1* 2/2021 Yoon ...................... H04W 72/21
(Continued)

FOREIGN PATENT DOCUMENTS

WO  2020/224967 A1  11/2020

OTHER PUBLICATIONS

International Search Report and Written Opinion mailed on Jul. 23, 2020, received for PCT Application PCT/EP2020/060560, Filed on Apr. 15, 2020, 12 pages.
(Continued)

*Primary Examiner* — Wei Zhao
(74) *Attorney, Agent, or Firm* — XSENSUS LLP

(57) ABSTRACT

A method of receiving data by a communications device in a wireless communications network, the method comprising receiving a downlink control message transmitted in first downlink communications resources of a wireless access interface provided by the wireless communications network, the downlink control message providing an indication of second downlink communications resources from which the communications device can receive downlink data, and receiving the downlink data from the second downlink communications resources, wherein the communications device is configured to operate in a first reception mode in which a receiver of the communications device is configured
(Continued)

to receive the downlink data transmitted according to a first format via the second downlink communications resources, or to operate in a second reception mode in which the receiver of the communications device is configured to receive the downlink data transmitted according to a second format via the second downlink communications resources.

20 Claims, 6 Drawing Sheets

(51) Int. Cl.
    *H04W 72/1263*     (2023.01)
    *H04W 72/20*     (2023.01)
    *H04W 72/23*     (2023.01)

(52) U.S. Cl.
    CPC ....... *H04W 72/0446* (2013.01); *H04W 72/20* (2023.01); *H04W 72/23* (2023.01)

(58) Field of Classification Search
    CPC .. H04W 72/044; H04L 1/0025; H04L 5/0053; H04L 1/002; H04L 5/005
    See application file for complete search history.

(56) References Cited

U.S. PATENT DOCUMENTS

2021/0168779 A1*   6/2021   Mondal ................. H04L 5/0035
2023/0389125 A1*  11/2023   Islam ................ H04W 52/0216

OTHER PUBLICATIONS

Huawei et al., "Procedure of Cross-Slot Scheduling for UE Power Saving", 3GPP TSG RAN WG1 #96bis, R1-1903987, Apr. 8-12, 2019, 4 pages.
Mediatek Inc., "Summary of Offline on Cross-Slot Scheduling", 3GPP TSG RAN WG1 Meeting #96-Bis, R1-1905819, Apr. 8-12, 2019, 17 pages.
Sony, "On Cross-Slot Scheduling for Power Saving", 3GPP TSG RAN WG1 #97, R1-1906857, May 13-17, 2019, 7 pages.
Nokia et al., "Revised SID: Study on NR Industrial Internet of Things (IoT)", 3GPP TSG RAN meeting #81, RP-182090, Sep. 10-13, 2018, 5 pages.
Holma et al., "LTE for UMTS OFDMA and SC-FDMA Based Radio Access", John Wiley & Sons, 2009, pp. 25-27.
3GPP, "NR; Medium Access Control (MAC) Protocol Specification (Release 15)", 3GPP TS 38.321 v15.3.0, Sep. 2018, pp. 1-76.
3GPP, "NR; Physical layer Procedures for Data (Release 15)", 3GPP TS 38.214 V15.2.0, Jun. 2018, pp. 1-94.
3GPP, "NR; NR and NG-RAN Overall Description; Stage 2 (Release 15)", 3GPP TS 38.300 V15.4.0, Dec. 2018, pp. 1-97.
Catt et al., "New WID: UE Power Saving in NR", 3GPP TSG RAN Meetings #83, RP-190727, Mar. 18-21, 2019, 5 pages.
Mediatek Inc., "Analysis of single receive RF chain", 3GPP TSG-RAN WG1 #68bis, R1-121182, Mar. 26-30, 2012, 9 pages.
3GPP, "Study on NR Industrial Internet of Things (IoT); (Release 16)", 3GPP TR 38.825 V16.0.0, Mar. 2019, pp. 1-33.

* cited by examiner

COMMUNICATIONS DEVICE, INFRASTRUCTURE EQUIPMENT AND METHODS FOR THE RECEPTION OF CONTROL INFORMATION BY A COMMUNICATIONS DEVICE IN A WIRELESS COMMUNIATIONS NETWORK

CROSS-REFERENCE TO RELATED APPLICATIONS

The present application is based on PCT filing PCT/EP2020/060560, filed Apr. 15, 2020, which claims priority to EP 19172649.6, filed May 3, 2019, the entire contents of each are incorporated herein by reference.

BACKGROUND

Field

The present disclosure relates to communications devices, infrastructure equipment and methods for the reception of control information by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide methods of receiving data by a communications device in a wireless communications network, the methods including receiving a downlink control message transmitted in first downlink communications resources of a wireless access interface provided by the wireless communications network, the downlink control information providing an indication of second downlink communications resources from which the communications device can receive downlink data, and receiving the downlink data from the second downlink communications resources. The wireless access interface communications device includes a time divided structure comprising communications resources divided into time divided units and the communications device is configured to operate in a first cross-slot scheduling mode in which the first downlink communications resources are in a first time unit and the second downlink communications resources are in a second time unit, or to operate in a second same-slot mode in which the first downlink communications resources are in the same time unit as the second downlink communications resources. Example embodiments provide an arrangement in which the communications device is configured to improve a likelihood of being in the same one of these two modes which corresponds to one of these two modes in which the data is transmitted by the wireless communications network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
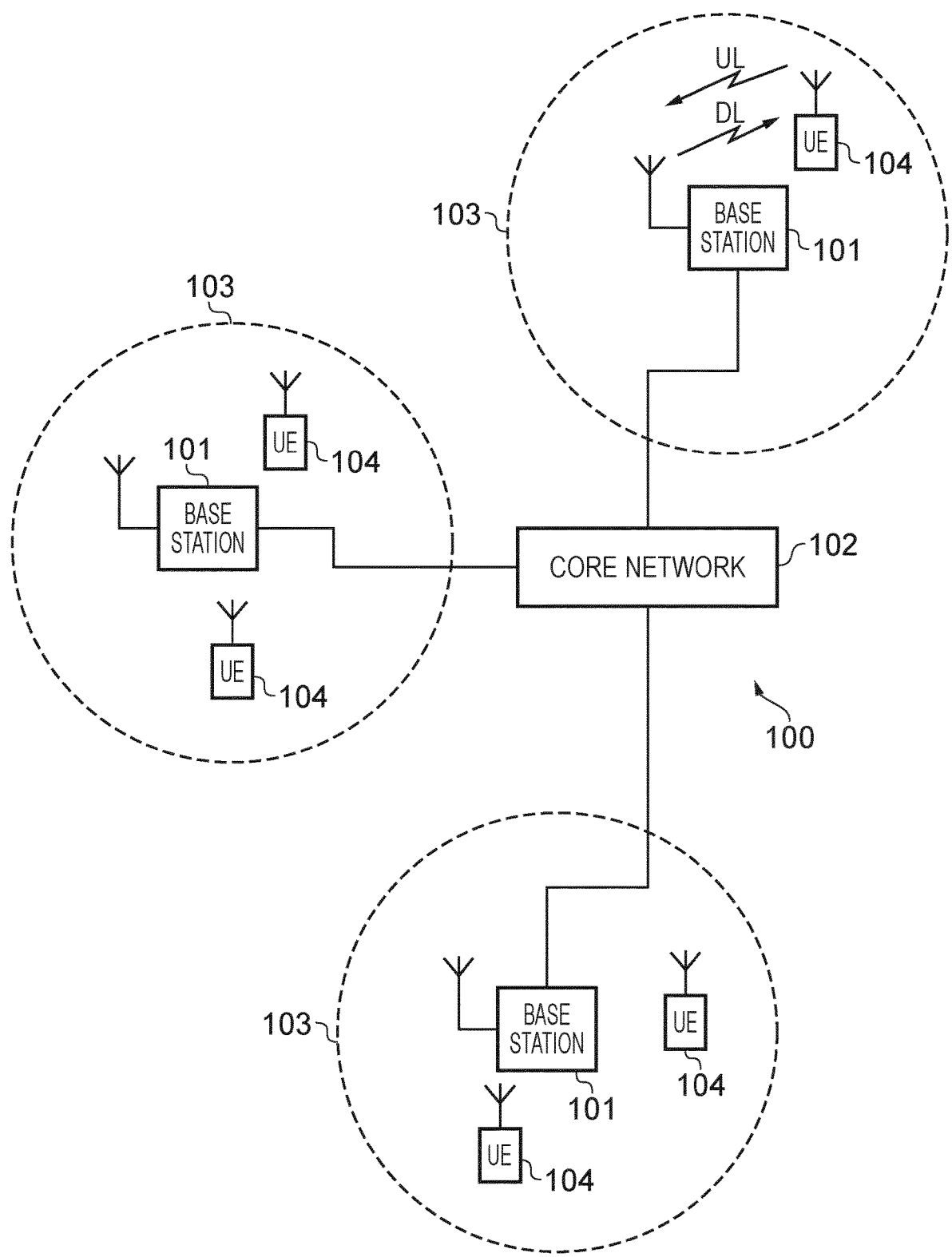
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
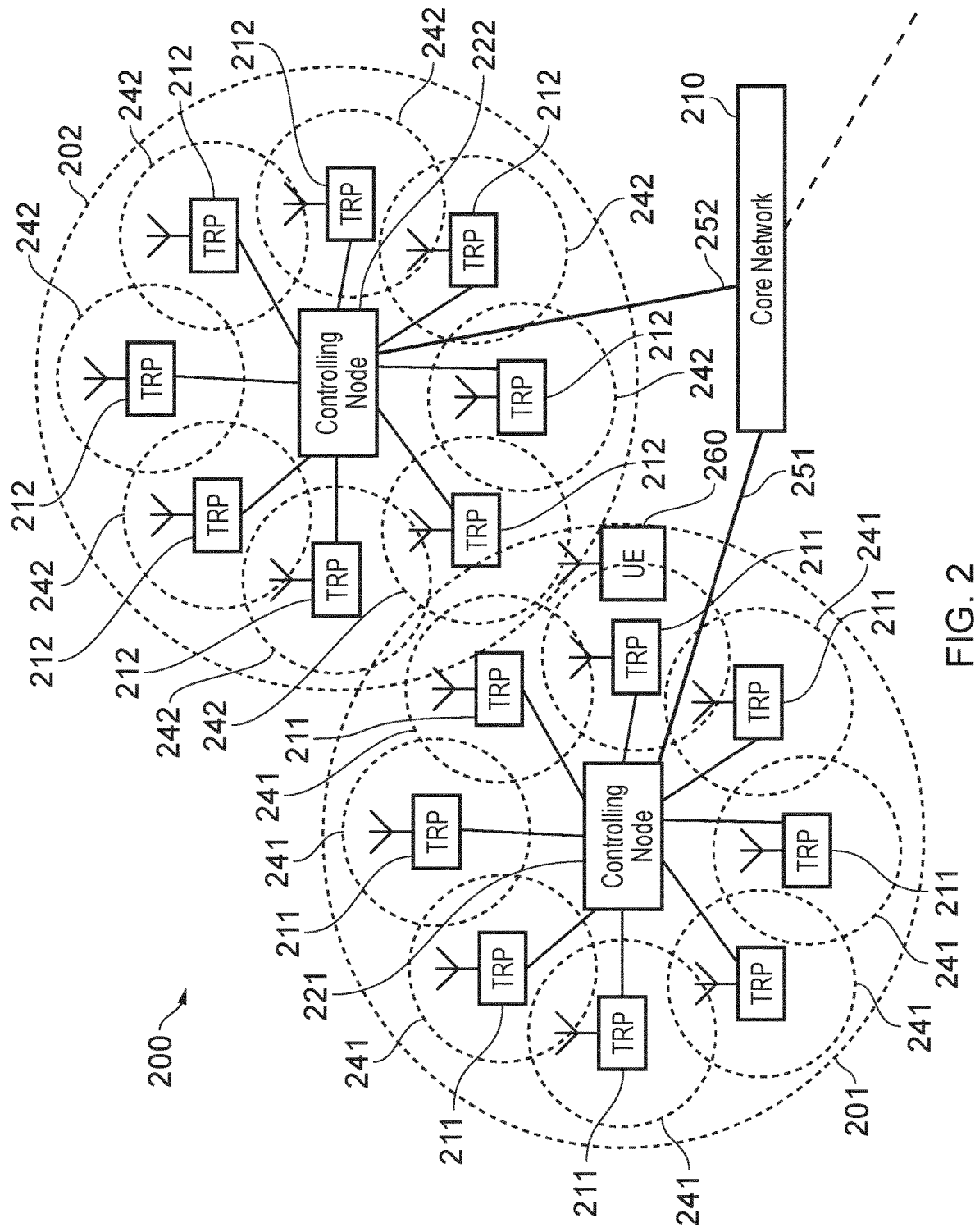
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
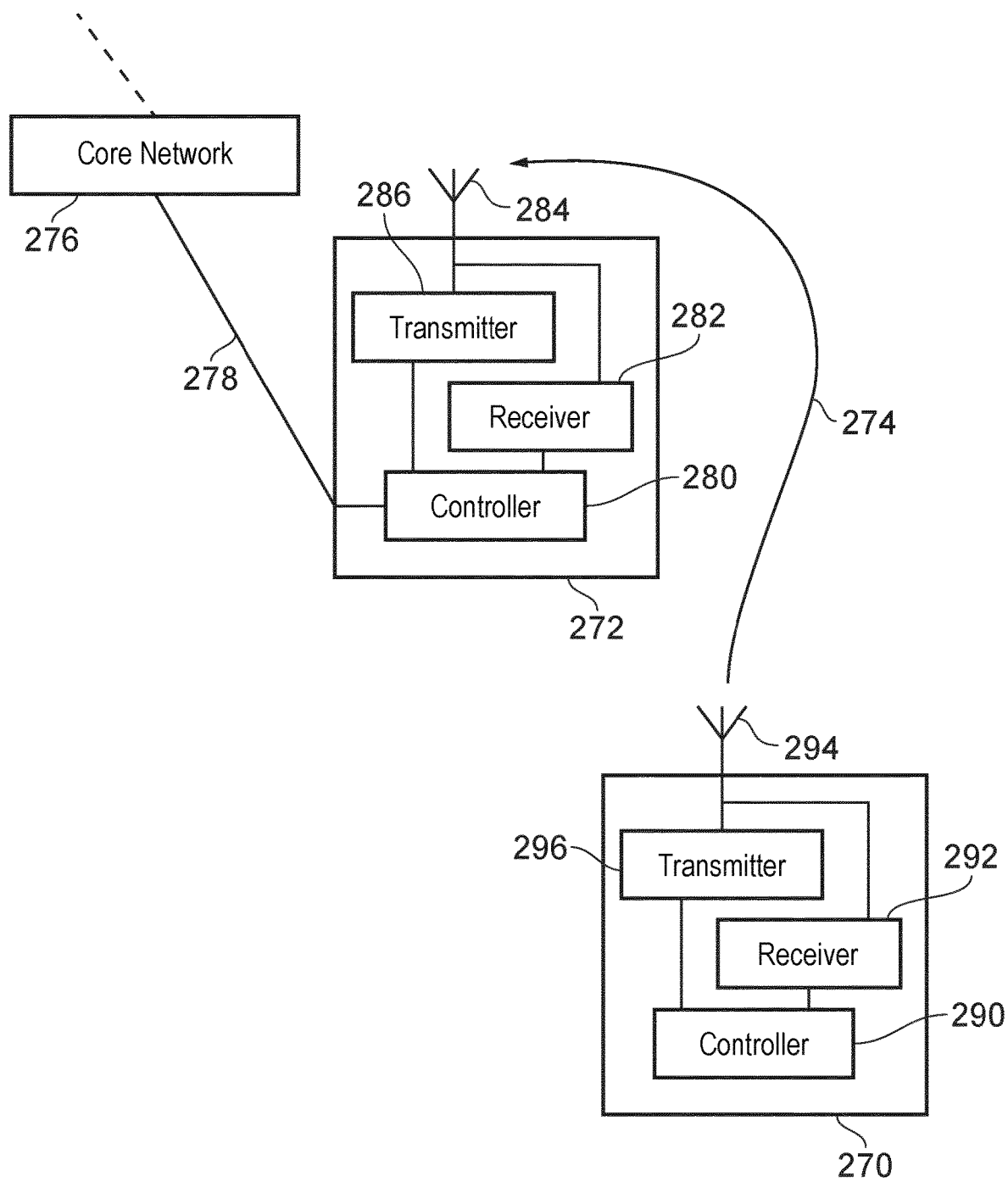
FIG. 3 is a schematic block diagram of an example infrastructure equipment and communications device which may be configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. The UE 270 may similarly be configured to receive downlink data transmitted by the infrastructure equipment 272 via resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [6].

URLLC services are required in order to meet the requirements for IIoT, which require high availability, high reliability, low latency, and in some cases, high-accuracy positioning [1]. Some IIoT services may be implemented by using a mixture of eMBB and URLLC techniques, where some data is transmitted by eMBB and other data is transmitted by URLLC.

Downlink Control Information

In 5G/NR, communications resources for both uplink and downlink communications are allocated by the infrastructure equipment, and may be signalled to the communications device in downlink control information (DCI), transmitted using a physical downlink control channel (PDCCH).

Each communications device may be configured with a specific search space within which the PDCCH may exist, the search space defining communications resources (and, optionally, other parameters) with which DCI allocating communications resources to that communications device may be transmitted.

A communications device may be configured with a PDCCH search space for each of a plurality of services. For example, communications resources allocated for the transmission or reception of URLLC data may be allocated by means of DCI transmitted in accordance with one search space, while communications resources allocated for the transmission or reception of eMBB data may be allocated by means of DCI transmitted in accordance with a different search space. The multiple PDCCH search spaces may be mutually exclusive, such that any PDCCH transmission which is in accordance with one PDCCH search space is necessarily not in accordance with a different PDCCH search space configured for the same communications device.

The PDCCH search space(s) may be configured for the communications device by means of RRC signalling.

Even within the constraints of a configured search space, there may be different parameters according to which DCI may be transmitted to a communications device, and there is no specific a priori indication to the communications device indicating if, or how, any DCI will be transmitted to the communications device.

Accordingly, it is necessary for a communications device to 'blind decode' multiple PDCCH 'candidates' within the search space, in order to attempt to determine if any DCI has been transmitted to it. Because of the different permitted parameters for transmitting the DCI, the communications device may have to attempt multiple blind decode attempts for given communications resources on which the DCI may (or may not) be transmitted.

Communications Resources for Downlink Data

Downlink data transmitted to a communications device may be transmitted using a Physical Downlink Shared Channel (PDSCH). The PDSCH can be dynamically scheduled by the infrastructure equipment in a Downlink (DL) Grant, i.e. scheduling information contained in a DCI. The DCI may be formatted in accordance with one of a plurality of predetermined (e.g. standardised) formats, such as DCI Format 1_0 and DCI Format 1_1.

The DL Grant comprises Frequency Domain Resource Assignment (FDRA) and Time Domain Resource Assignment (TDRA) fields, which indicate the frequency and time resources of the PDSCH respectively. The FDRA indicates a number and location of physical resource blocks (PRBs) occupied by the PDSCH.

The TDRA field may comprise an index to a row of a TDRA Table, where each entry/row in this table specifies a position of downlink measurement reference symbols (DMRS), a mapping type for the PDSCH (which may be a Type A or Type B mapping), a slot gap parameter $K_0$, a start symbol offset S and a duration of the PDSCH resources L.

Figure 4:
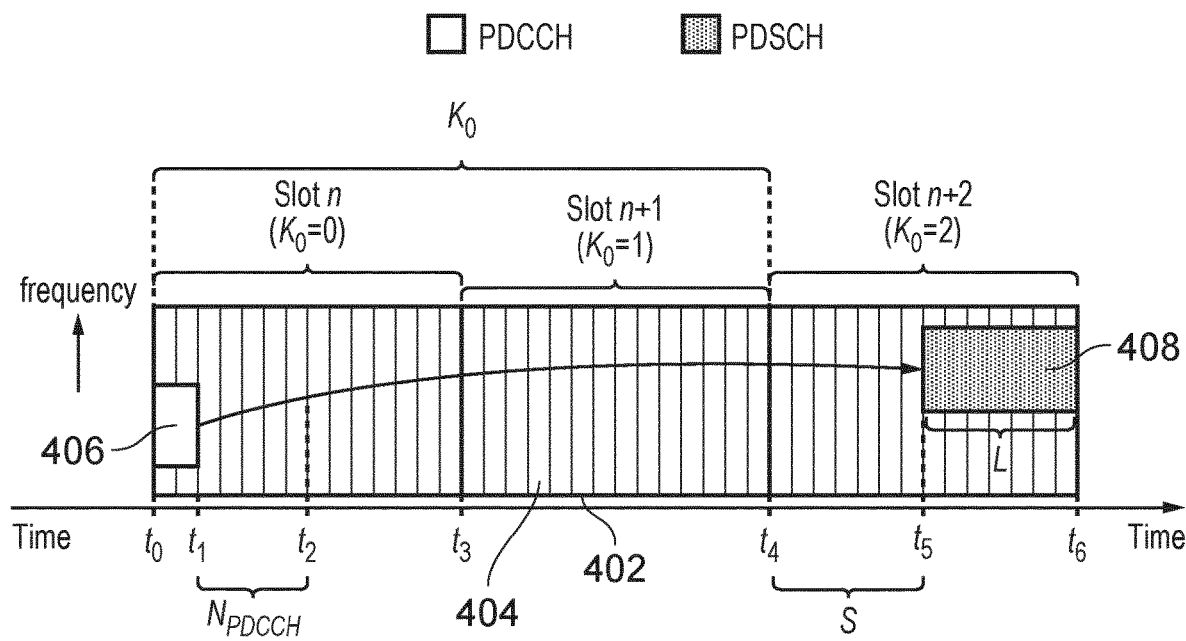
FIG. 4 illustrates a reception of downlink data in accordance with conventional techniques.

FIG. 4 illustrates a reception of downlink data in accordance with conventional techniques. FIG. 4 illustrates an example of a use of the $K_0$, S and L parameters for a PDSCH.

FIG. 4 shows communications resources 402 of a downlink of a wireless access interface of a wireless communications network. The communications resources are divided into timeslots n, n+1, n+2, each of which is further subdivided into 14 orthogonal frequency division multiplexing (OFDM) symbol periods 404.

A DL grant is transmitted within a PDCCH transmission 406 from time t0 to time t1 within timeslot n. The DL Grant comprises a TDRA index which points to an entry in the TDRA Table which indicates parameters $K_0=2$, $S=7$ and $L=7$. Since the DL Grant is in Slot n, the allocated PDSCH resources therefore start in Slot n+$K_0$, i.e. Slot n+2. The symbol offset from the slot boundary of Slot n+2 is indicated by the parameter S, which in this case is 7 symbols from the slot boundary. Accordingly, the start time of the PDSCH is at time t5 (7 symbols from the start of timeslot n+2). The duration of the PDSCH is L=7 symbols. Hence, the TDRA parameters indicate a PDSCH transmission between time t5 and t6 as shown in FIG. 4. The entries in the TDRA table may be semi-statically configured by radio resource control (RRC) and the size of the table may be up to 16 entries.

Until a DCI has been successfully decoded, it is not possible for the communications device to determine which, if any, communications resources have been allocated to it for the uplink or downlink transmission of data. In the case of downlink transmissions, if the allocated communications resources may coincide in time with the blind decoding of the DCI, it is necessary for the communications device to pre-emptively receive and buffer signals received on downlink communications resources which may be allocated for the downlink transmission of data. These buffered signals may subsequently be processed (i.e. decoded) only if a DCI is successfully decoded indicating that downlink data is (has been) transmitted using these downlink communications resources.

In the example of FIG. 4, a downlink PDCCH transmission 406 occurs from time t0 to time t1. A communications device, such as the communications device 270 described above, controls its receiver 292 to receive the signals of the PDCCH, in accordance with a pre-configured PDCCH search space.

During the time period $N_{PDCCH}$ from time t1 to time t2, the communications device 270 performs blind decoding of the PDCCH received signals. The PDCCH transmission 406 may indicate that downlink communications resources starting at, or after, time t1 are allocated for the downlink transmission of data to the communications device 270. Accordingly, during the time period from t1 to t2, the communications device 270 may configure its receiver to receive downlink signals of a PDSCH on which the downlink data may be being transmitted.

In the example of FIG. 4, as a result of the blind decoding of the PDCCH signals received from time t0 to time t1, the communications device 270 determines that PDCCH transmission 406 comprises a DCI. Furthermore, the communications device 270 determines that the DCI indicates that downlink communications resources 408 of the PDSCH, from time t5 to time t6, are allocated for the downlink transmission of data to the communications device 270. Accordingly, the communications device 270 may control its receiver 292 to receive signals of the PDSCH from time t5 to time t6. These received PDSCH signals may be decoded, and the communications device 270 may accordingly receive the data transmitted by the infrastructure equipment.

It has been appreciated that requiring the communications device 270 to enable its receiver during the time period t1 to t2 (i.e. while blind decoding of the PDCCH signal is being carried out) is an inefficient use of power, especially in cases (as in FIG. 4) where no PDSCH transmission is scheduled for the communications device 270 during that time.

To address this, one proposal within the context of ongoing work related to power-saving in 5G/NR [7] is that a DL grant may only allocate downlink communications resources which start in a slot occurring after the slot in which the DL grant is transmitted. In other words, $K_0$ may be constrained to be no less than 1. Such scheduling is referred to as 'cross-slot scheduling'. In accordance with this proposal, the communications device 270 would not be required to enable its receiver between the end of the communications resources on which the DCI may be transmitted, and the beginning of the subsequent slot.

As described above, one of the targeted services for 5G is Ultra Reliable Low Latency Communications (URLLC) where it is required that a data packet at layer 2 is transmitted with a latency that is less than 1 ms or 0.5 ms with reliability of 99.999% to 99.9999%.

When low latency operation is important, for example during a burst of data, it is beneficial to switch from the cross-slot scheduling mode of operation to a lower latency mode of operation, which may require a higher power consumption.

In order that this switch can be performed quickly it is proposed that DCI signalling is used to switch between a cross-slot scheduling mode of operation and a lower latency mode of operation. DCI signalling used to switch between modes of operation is referred to herein as mode switching DCI. In some scenarios, the mode switching DCI may also comprise an indication of an allocation of communications resources on a PDSCH or PUSCH.

An example of a lower latency mode of operation is referred to as 'same-slot scheduling', in which data can be transmitted (either uplink or downlink, as applicable) within the same timeslot as the timeslot in which the DCI, which indicates the resources allocated for the transmission of the data, is transmitted. Some issues associated with such switching are discussed in [8].

In some embodiments, mode of operation which may be a power saving mode as described in [9], the contents of which are herein incorporated by reference.

Same-slot scheduling allows the data to be transmitted in the same slot as the DCI; that is, there may be no minimum constraint on $K_0$. In accordance with same-slot scheduling, in a specific instance, the DCI may indicate that the data is to be (or has been) transmitted in a different slot to the DCI. However, since it is permitted for the data and the DCI to be transmitted in the same slot and the communications device cannot determine when the data is to be or has been transmitted before it completes decoding of the DCI, the communication device has to turn on its RF and buffer samples until it has decoded the DCI, in case the data is transmitted during the decoding time.

In contrast, because cross-slot scheduling guarantees that the DCI and associated data are in different slots, the communication device may turn its RF off and stop buffering samples after the OFDM symbols carrying the DCI have been received.

It will be appreciated that a mode of operation may be characterised either by a general restriction on scheduling (e.g. 'cross-slot' or 'same slot' scheduling) or by a restriction on $K_0$ values (and hence, in some embodiments, on TDRA table rows) which may be used to indicate the allocated/scheduled communications resources. In some embodiments, these may be equivalent: for example, cross-slot scheduling may imply that $K_0$ values of 0 (which indicate resources starting in the same slot as the DCI) cannot be used to indicate the allocated communications resources. In some embodiments, a mode of operation may be characterised by a minimum $K_0$ value which may be used.

The inventor of the present technique has recognised that unreliable reception and decoding of signalling indicating a switch in mode of operation may have significant consequences in terms of the continued effective transmission and reception of data.

There is thus provided a method of receiving data by a communications device in a wireless communications network, the method comprising receiving a downlink control message transmitted in first downlink communications resources of a wireless access interface provided by the wireless communications network, the downlink control message providing an indication of second downlink communications resources from which the communications device can receive downlink data, and receiving the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, the method comprising receiving a mode switching control message, the mode switching control message indicating that a mode of operation of the communications device is to be changed from one of the first reception mode and the second reception mode to the other of the first reception mode and the second reception mode until another mode switching control message is received, and transmitting one or more signals to confirm a current mode of operation, wherein the transmitting the one or more signals to confirm the current mode of operation comprises: determining uplink communications resources allocated for a transmission of an acknowledgement of the mode switching control message, determining that the acknowledgement is to be transmitted in response to receiving the mode switching control message, and transmitting the acknowledgement using the allocated uplink communications resources.

Embodiments of the present technique may avoid situations where the infrastructure equipment has indicated a semi-static mode change to the communications device, and subsequently operates in accordance with that mode change, while the communications device continues to operate in a previous mode. For example, where communications resources are scheduled in accordance with the mode, embodiments of the present technique can avoid that the communications device fails to receive or transmit using the scheduled communications resources due to a mismatch between the mode of operation of the communications device and the mode of operation which the infrastructure equipment considers the communications device to be operating in.

Inapplicable Rows

As described above, the communications device may be configured with a TDRA table. The communications device may also be configured to operate in one of a number of modes of operation, such as a cross-slot scheduling mode and a same slot scheduling mode.

In some embodiments, one or more rows of the configured TDRA table may be incompatible with the particular configuration or mode of operation. In other words, the table entry may indicate allocated communications resources which cannot be validly allocated in the current mode of operation.

To illustrate an example of such embodiments, Table 1 shows an example of a configured TDRA table. Table 1 omits for conciseness the PDSCH Mapping Type and DMRS position parameters.

TABLE 1

Example TDRA entries for PDSCH

| TDRA Index | $K_0$ | S | L |
|---|---|---|---|
| 0 | 0 | 2 | 4 |
| 1 | 0 | 10 | 4 |
| 2 | 1 | 0 | 2 |
| 3 | 2 | 7 | 7 |

In this example, it is clear that some TDRA table entries indicate a PDSCH transmission which occurs significantly after the PDCCH transmission. For example, TDRA index=3 indicates PDSCH resources which start 2 timeslots after the timeslot in which the PDCCH transmission occurs. Such a TDRA entry (as well as the entry corresponding to index 2) is incompatible with a same-slot scheduling mode of operation.

Similarly, TDRA indices 0 and 1 indicate PDSCH resources within the same slot ($K_0$=0) as the PDCCH resources used for the associated DCI. These indices are thus incompatible with a cross-slot scheduling mode of operation.

According to some embodiments of the present technique, the UE may be switched between a same-slot scheduling mode and a cross-slot scheduling mode in one or more of the following ways:

The UE is configured with two (or more) TDRA tables (e.g. via RRC signalling). The mode switching DCI indicates which of these TDRA tables should be used in the future.

The UE is assigned with a single TDRA table and is configured with a parameter that signals which values within the TDRA table are allowed for future allocations. The value of the parameter is signalled via the mode switching DCI signalling. E.g. the parameter could be the value "$K_0$" and the mode switching DCI could signal whether the UE uses $K_0$=0 (for same-slot scheduling) or $K_0$=1 (for cross-slot scheduling).

The UE is assigned with a single TDRA table and is configured with a bitmap that signals which entries within the TDRA table are allowed for future allocations. The bitmap is signalled via the mode switching DCI signalling.

However, DCI transmission and reception is not guaranteed to be error free. A possible error scenario is that a DCI is transmitted to the UE, but that DCI is not correctly decoded by the UE. When the DCI is used for scheduling communications resources on PDSCH or PUSCH and is not a mode switching DCI, such an error is not serious since the consequence is that a single PDSCH transmission is not received by the UE, or a single PUSCH transmission does not occur. A PDSCH/PUSCH re-transmission protocol (such as HARQ) can correct or recover from such errors. A DCI which comprises an indication of scheduled PDSCH or PUSCH communications resources is referred to as a scheduling DCI. A scheduling DCI may also be a mode switching DCI.

A DCI signalling error is more serious when the DCI signals a change in UE state (or a semi-static configuration of the UE), that is, when the DCI is a mode switching DCI.

The present disclosure is particularly directed at a scenario where the change of UE state corresponds to a change between same-slot scheduling and cross-slot scheduling, however it will be appreciated that the present disclosure is not so limited, and that the technique disclosed herein may be applied to other UE state changes.

Table 2 lists message (e.g. DCI contents) which command a change in a semi-static state of the communications device and which can cause adverse operation if there is a failure of the communications device to correctly decode the message.

The techniques disclosed herein may be applied in respect of one or more mode switching control messages listed in Table 2.

TABLE 2

Messages/DCI contents where signaling errors may cause adverse operation

| Message | Consequences of signalling error |
|---|---|
| Wake-up outside active time | WUS signalling leads to active time being cancelled and the UE being unreachable |
| Wake-up inside active time | WUS signalling leads to active time being cancelled and the UE being unreachable |
| Cross slot scheduling | UE can become unreachable if gNB assumes same-slot scheduling and UE assumes cross-slot scheduling |
| Single vs multi-cell operation | If UE assumes single-cell and gNodeB assumes multi-cell, the UE can be unreachable if signalled to using the wrong cell. |
| BWP/Scell | If UE assumes a different BWP/SCell to the gNodeB, the UE can become unreachable |
| multiple input/ multiple output (MIMO) layer adaptation | E.g. if UE assumes it can monitor with a single RX antenna and gNodeB assumes UE is monitoring with multiple RX antennas, the UE may be scheduled with a high modulation and coding scheme (MCS) that it cannot decode |
| CORESET/ search/ space/candidate of subsequent PDCCH decoding | UE assumes a different set of search spaces/ candidates to that at the gNodeB, leading to the UE potentially becoming unreachable |

TABLE 2-continued

Messages/DCI contents where signaling errors may cause adverse operation

| Message | Consequences of signalling error |
| --- | --- |
| PDCCH monitoring periodicity | If UE assumes a infrequent monitoring of PDCCH and the gNB assumes frequency monitoring of PDCCH, the UE may become unreachable. |
| semi-persistent scheduling (SPS) activation | If UE assumes SPS is activated when the gNodeB assumes SPS is deactivated, UE SPS transmissions can collide with transmissions from other UEs making those transmissions undecodable |
| discontinuous reception (DRX) configuration | UE assumes one DRX configuration and the gNodeB assumes a different DRX configuration, making the UE unreachable |

Problem Scenario

A particular problem occurs when the gNodeB has previously transmitted an indication to the communications device that the UE is to operate using same slot scheduling which was not correctly received by the communications device. As a result, the communications device is currently operating in a cross-slot scheduling mode of operation.

Such a mismatch in understanding could occur when, while the UE is operating in a cross-slot scheduling mode, the gNB/infrastructure equipment sends a mode switching DCI to the UE to cause it to change to a same slot scheduling mode. If the UE does not receive that mode switching DCI, it would remain in the cross-slot scheduling mode while the gNB would operate as if the UE were operating with same-slot scheduling.

As described above, when operating in the cross-slot scheduling mode, the communications device is able to reduce its power consumption by disabling some or all of its receiver during the remainder of a timeslot, after the PDCCH signals potentially carrying a DCI have been received. This is because according to cross-slot scheduling, no PDSCH resources will be allocated by such a DCI within the same slot. The disabling of some or all of a receiver may be carried out even if the communications device has not yet completed decoding of the PDCCH signals, and thus cannot determine either that a DCI has been transmitted or which PDSCH resources have been allocated by a DCI.

In this mismatched situation, when the gNB schedules the UE in a same-slot scheduling fashion, the UE may either not be able to receive the allocated PDSCH or may consider the received DCI as invalid (because it allocates resources which are inconsistent with a cross-slot scheduling mode). Consequently, according to conventional techniques, the communications device may refrain from transmitting any HARQ feedback (in the latter case) or may indicate a NACK (negative acknowledgement) in the former case.

In either case, the gNB would not be able to determine a reason for the absence of a positive acknowledgement. In particular, the gNB may continue to use same-slot scheduling, in conflict with the present actual mode of operation of the communications device.

Hence it is an object of the present technique to provide a robust method of DCI signalling for cases where the DCI signals a semi-static change in the operation of the UE. The invention particularly considers the case where the DCI signals a semi-static change in the cross-slot or same-slot scheduling state of the UE.

According to some embodiments of the present technique, the communications device transmits an indication in response to receiving an indication of a semi-static change, such as via a mode switching DCI. In some embodiments, the indication may be selectively transmitted depending on the particular change.

PDCCH ACK

In some embodiments, in response to receiving an indication of a changed power saving state transmitted by the infrastructure equipment, the communications device transmits an acknowledgement indication, the acknowledgment indication indicating that the indication of the changed power saving state was received.

In some embodiments, the indication of the changed power saving state comprises a transmission of a mode switching DCI.

In some embodiments, the communications device determines whether a received DCI comprises an indication of a changed power saving state, i.e. whether the DCI is a mode switching DCI, and transmits the acknowledgement information only if it does. In particular, the communications device may refrain from transmitting an acknowledgement indication in response to a received DCI which comprises an indication of allocated communications resources, and does not include an indication of a changed power saving state.

In some embodiments, the acknowledgement indication is transmitted using predetermined communications resources, referred to herein as acknowledgement communications resources. In some embodiments, the infrastructure equipment 272 transmits an indication of the acknowledgement communications resources to the communications device 270. In some embodiments, the indication of the acknowledgement communications resources is included within RRC signalling. In some embodiments, the indication of the acknowledgement communications resources for transmitting an acknowledgement of a mode switching DCI is included within the mode switching DCI.

In some embodiments, the acknowledgement communications resources are determined by the communications device 270 based on the communications resources used for the transmission of the mode switching DCI. For example, the acknowledgement communications resources may start in an OFDM symbol period within a timeslot having a same number as the OFDM symbol period in which the communications resources used for the transmission of the mode switching DCI begin.

In some embodiments, the mode switching DCI comprises an indication of a parameter which indicates a time offset between the communications resources used for the transmission of the mode switching DCI and the start of the acknowledgement communications resources. For example, the parameter may be a slot offset parameter, which indicates the timeslot in which the acknowledgement communications resources are located.

In some embodiments, the acknowledgement communications resources are on a physical uplink control channel (PUCCH).

The PDCCH may be physically sent using one or more control channel elements (CCEs). Each of the CCEs is groups of OFDM subcarriers and OFDM symbols. In some embodiments the PUCCH may be determined based on the CCE(s) used for the PDCCH transmission. For example, the lowest CCE number used for a PDCCH can be used to implicitly derive the PUCCH to use. In an example, first PDCCH (PDCCH1) is transmitted using CCE0,2,4,6 and second PDCCH (PDCCH2) is transmitted using CCE1,3,5, 7. In accordance with a preconfigured mapping, a first PUCCH (PUCCH1) is used if the lowest CCE used for the PDCCH is CCE 0, and a second PUCCH (PUCCH2) is used if the lowest CCE is CCE 1.

Accordingly, in this example, if the communications device receives a message transmitted using PDCCH1, the UE determines that the lowest CCE number is 0 and uses PUCCH1.

Accordingly, in some embodiments, the communications device 270 receives and decodes the mode switching DCI and determines that the mode switching DCI satisfies the criteria for acknowledgement (as described above, this may comprise determining that the DCI is a mode switching DCI). The communications device adjusts its mode of operation (for example, switching from cross-slot scheduling to same slot scheduling) in accordance with the mode switching DCI.

In response to determining that the mode switching DCI satisfies the criteria for acknowledgement, the communications device 270 transmits an acknowledgement via the acknowledgement communications resources, which may be on a PUCCH.

In some embodiments, the infrastructure equipment/gNB 272 transmits the mode switching DCI and monitors the acknowledgement communications resources. If it determines that an acknowledgement was transmitted by the communications device 270 using the acknowledgement communications resources, it determines that the communications device 270 has modified or adjusted its mode of operation in accordance with the mode switching DCI.

If the infrastructure equipment determines that no acknowledgement was transmitted by the communications device 270 using the acknowledgement communications resources, it determines that the communications device 270 has not modified or adjusted its mode of operation in accordance with the mode switching DCI. In some embodiments, the infrastructure equipment 272 continues to operate in accordance with the previous mode of operation (e.g. by using cross-slot scheduling for subsequent scheduling of PDSCH and/or PUSCH). In some embodiments, in response to determining that the communications device 270 has not received the mode switching DCI, the infrastructure equipment 272 retransmits the mode switching DCI.

Misalignment Criteria

In the example described above, the only criterion for transmitting an acknowledgement to a DCI is that the DCI is a mode switching DCI.

In some embodiments, an acknowledgement is transmitted only if the nature of the change of operation satisfies certain criteria. For example, in some embodiments, the UE only sends an acknowledgement for a mode switching DCI indicating a configuration change if a failure to implement such a configuration change can cause a critical misalignment between the UE and gNB.

As an example of such a possible misalignment which is not critical, the UE may be operating in a same-slot scheduling mode of operation when the gNB sends a mode switching DCI that indicates the UE should use only TDRA table entries with value $K_0>0$. As described above, TDRA table entries having a value of $K_0>0$ are compatible only with a cross-slot scheduling mode of operation.

However, provided that the communications device 270 does not ignore a DCI scheduling PDSCH communications resources, where the PDSCH communications resources are indicated by a TDRA table index associated with a value of $K_0>0$, then a consequence of the communications device 270 failing to receive the mode switching DCI and implement the indicated configuration change is that the communications device 270 will not implement power saving techniques (such as disabling part of its receiver) which are possible in a cross-slot scheduling mode of operation, as described above. The communications device 270 will be able to receive any data transmitted using PDSCH resources allocated in accordance with the scheduling DCI.

As an example of a critical misalignment, if the UE is performing cross-slot scheduling (i.e. TDRA table entries with $K_0=0$ are inapplicable), the gNB may send a mode switching DCI indicating that the UE should also use TDRA table entries allowing same-slot scheduling ($K_0=0$). As described above, in accordance with the cross-slot scheduling mode of operation, the communications device may reduce its power consumption by disabling part or all of its receiver from the end of the PDCCH resources used to transmit the DCI until the end of the slot. Thus, a consequence of the UE not receiving the configuration may be that the gNB schedules PDSCH transmissions which occur while the UE's receiver is not fully enabled. Accordingly, the PDSCH transmissions would not be received by the UE.

In general, a critical misalignment may arise if a mode switching DCI is not received which indicates a switch from a first mode of operation to a second mode of operation, and communications resources on PDSCH which are validly scheduled in accordance with the second mode of operation cannot be received correctly by a communications device operating in the first mode of operation. As such, for example, according to embodiments of the present technique, the communications device may determine that an acknowledgement is to be transmitted if, when operating in accordance with the current mode of operation, the communications device may not be able to receive data transmitted using communications resources which may be validly scheduled in accordance with the new mode of operation, for example because the communications device is permitted to disable its receiver during a particular period in accordance with the current mode of operation.

A corresponding determination may be made by the infrastructure equipment 272. Based on the determination that the mode switching DCI, if not received, may result in a critical misalignment, the infrastructure equipment 272 may determine that the communications device 270 is to transmit an acknowledgement of the mode switching DCI.

Explicit 'ACK Required' Bit in Mode Switching DCI

In some embodiments, a criterion for transmitting an acknowledgement to a mode switching DCI is that the DCI comprises an indication that an acknowledgement is to be transmitted. For example, a mode switching DCI may be acknowledged only if it contains a sequence of one or more bits, in which a predetermined one or more of the bits in the sequence indicate that the DCI should be acknowledged. If the one or more bits in the sequence correspond to an indication that the DCI should be acknowledged, the UE responds by transmitting a PDCCH ACK/NACK using the acknowledgement communications resources (e.g. on PUCCH).

In some embodiments, the mode switching DCI may be acknowledged only if each of a plurality of bit fields is set in accordance with predetermined values, the combination of which indicate that the DCI is to be acknowledged. One or more of the bit fields may also be used to indicate other parameters. For example, a first bit field represents a transport block size, and the first pre-determined value corresponds to a large transport block size, a second bit field represents an amount of physical resource, and the second pre-determined value represents a small amount of physical resource. When both the first and second bit fields contain their respective predetermined values, the mode switching DCI is to be acknowledged.

Response to Inapplicable TDRA Entry in Scheduling DCI

In some embodiments of the present technique, the communications device 270 may determine that a scheduling DCI has been received in which communications resources have been allocated in a manner contrary to its current mode of operation. In some embodiments, such a determination of a mismatch may comprise determining that the scheduling DCI comprises an indication of a TDRA table row which is inapplicable according to the current mode of operation (e.g. based on a current restriction of $K_0$), as described above.

In some embodiments of the present technique, the scheduling DCI contains an indication of which TDRA table is being used for the scheduling. If the TDRA table being used by the infrastructure equipment (i.e., indicated in the scheduling DCI) is different to the TDRA table configured at the communication device, the communication device determines that a mismatch has occurred.

In some embodiments, the communications device, in response to such a determination, transmits an operation mode mismatch indication to the infrastructure equipment 272.

In some embodiments, the operation mode mismatch indication comprises a predetermined sequence of bits transmitted using resources allocated for the acknowledgement of received data. For example, the operation mode mismatch indication may comprise a known bit string in a HARQ codebook. Conventionally, a HARQ codebook is a bitmap that identifies which downlink data transmitted by the infrastructure equipment to the communications device has been successfully received and decoded ("ACK") and (implicitly or explicitly) which has not ("NACK"). In accordance with a HARQ codebook, bundling and multiplexing of ACK/NACK bits may be possible. In embodiments of the present technique a predetermined setting of a bit within a HARQ bitstring is used as the operation mode mismatch indication. In some embodiments, a predetermined sequence of bits is used to represent the operation mode mismatch indication.

In some embodiments, the operation mode mismatch indication comprises a random access transmission on a physical random access channel (PRACH). The operation mode mismatch indication may comprise a transmission of a predetermined PRACH preamble sequence. The PRACH transmission may be on PRACH communications resources which are associated in a predetermined manner with the communications resources on which the scheduling DCI was transmitted.

In some embodiments, the operation mode mismatch indication is transmitted within an RRC message or a MAC control element (CE). The operation mode mismatch indication may thus be transmitted using PUSCH communications resources allocated for the transmission of uplink data by the communications device 270. If no PUSCH communications resources are allocated, then the communications device 270 may perform a random access transmission on a PRACH in order to request PUSCH communications resources, and may transmit the operation mode mismatch indication using the subsequently allocated PUSCH communications resources. Alternatively, the communications device 270 may transmit the operation mode mismatch indication in accordance with conventional early data transmission (EDT) techniques.

In some embodiments, the operation mode mismatch indication is implicit. For example, the scheduling DCI may comprise an indication (implicitly or explicitly) of uplink communications resources for a PUCCH transmission of acknowledgement information (such as HARQ feedback, described above). In some embodiments, in response to determining that the scheduling DCI comprises an indication of an inapplicable TDRA entry, the communications device 270 refrains from transmitting using the allocated PUCCH communications resources, thus indicating the operation mode mismatch indication.

In accordance with embodiments of the present technique, the infrastructure equipment may accordingly determine that a scheduling DCI comprised an indication of a TDRA entry which is inapplicable in accordance with the current mode of operation of the communications device 270 or that a scheduling DCI comprised an indication of a TDRA table which is different from that with which the communications device 270 is currently configured.

In response, the infrastructure equipment 272 may transmit a mode switching DCI to the communications device 270 comprising an indication that the communications device 270 should change its mode of operation. Alternatively, the infrastructure equipment 272 may determine the current mode of operation of the communications device 270 and may schedule future PDSCH/PUSCH communications resources in accordance with the determined mode of operation of the communications device 270 (e.g. may ensure that the allocated PDSCH/PUSCH communications resources can be indicated by means of a TDRA row which is not inapplicable in the current mode of operation of the communications device 270).

Mode of Operation Signalling

In some embodiments of the present technique, the communications device 270 provides an indication of its current mode of operation, which may be referred to as a current mode indication.

For example, the communications device 270 may transmit a current mode indication which indicates a minimum $K_0$ value according to a most recently received mode switching DCI.

In some such embodiments, the current mode indication comprises a predetermined scrambling sequence used to scramble a PUCCH transmission, the PUCCH transmission comprising an acknowledgement indication in respect of data previously transmitted on a PDSCH.

In accordance with such embodiments, in some embodiments the infrastructure equipment 272 may determine a currently expected mode of operation (e.g. corresponding to the most recently transmitted mode switching DCI) and may attempt to decode the PUCCH transmission using the predetermined scrambling code associated with the currently expected mode of operation.

If the infrastructure equipment 272 fails to decode the PUCCH in this manner, in some embodiments it continues to attempt to decode the PUCCH in accordance with each of the predetermined scrambling codes which are associated with other modes of operation until it either has attempted all such scrambling codes, or has successfully decoded the PUCCH.

If the infrastructure equipment 272 fails to decode the PUCCH using the predetermined scrambling code associated with the currently expected mode of operation then, in some embodiments, when it next allocates PUCCH communications resources to the communications device 270, the infrastructure equipment 272 attempts to decode the signals received on the next allocated PUCCH resources using one or more scrambling codes which are not associated with the currently expected mode of operation.

In some embodiments, the current mode indication comprises a predetermined setting of one or more bits in a HARQ feedback. For example, a bit in the HARQ codebook indicates which minimum $K_0$ value is being used by the communications device.

In some embodiments, the communications device 270 provides an implicit indication of its current mode of operation. The implicit indication of its current mode of operation may comprise an indication of a number of changes of the mode of operation. The indication of a number of changes of the mode of operation may indicate the number of changes modulo 2. Each possible value of the indication of the number of changes of the mode of operation may be associated with a predetermined scrambling code.

For example, two scrambling codes may be predetermined: a first scrambling code for use where the number of changes modulo 2 is equal to 0, and a second scrambling code for use where the number of changes modulo 2 is equal to 1.

The communications device 270 may accordingly scramble a PUCCH transmission as described above, using either the first or second scrambling codes, depending on the number of previously received mode switching DCI which have been received. Accordingly, a change of mode of operation may be indicated to the infrastructure equipment 272, requiring fewer predetermined scrambling codes than the number of different modes of operation.

For example if there are 5 different possible minimum $K_0$ configurations, 2 different PUCCH scrambling codes may be used, where the PUCCH scrambling code is toggled between these two scrambling codes whenever a change in minimum $K_0$ value is made.

Figure 5:
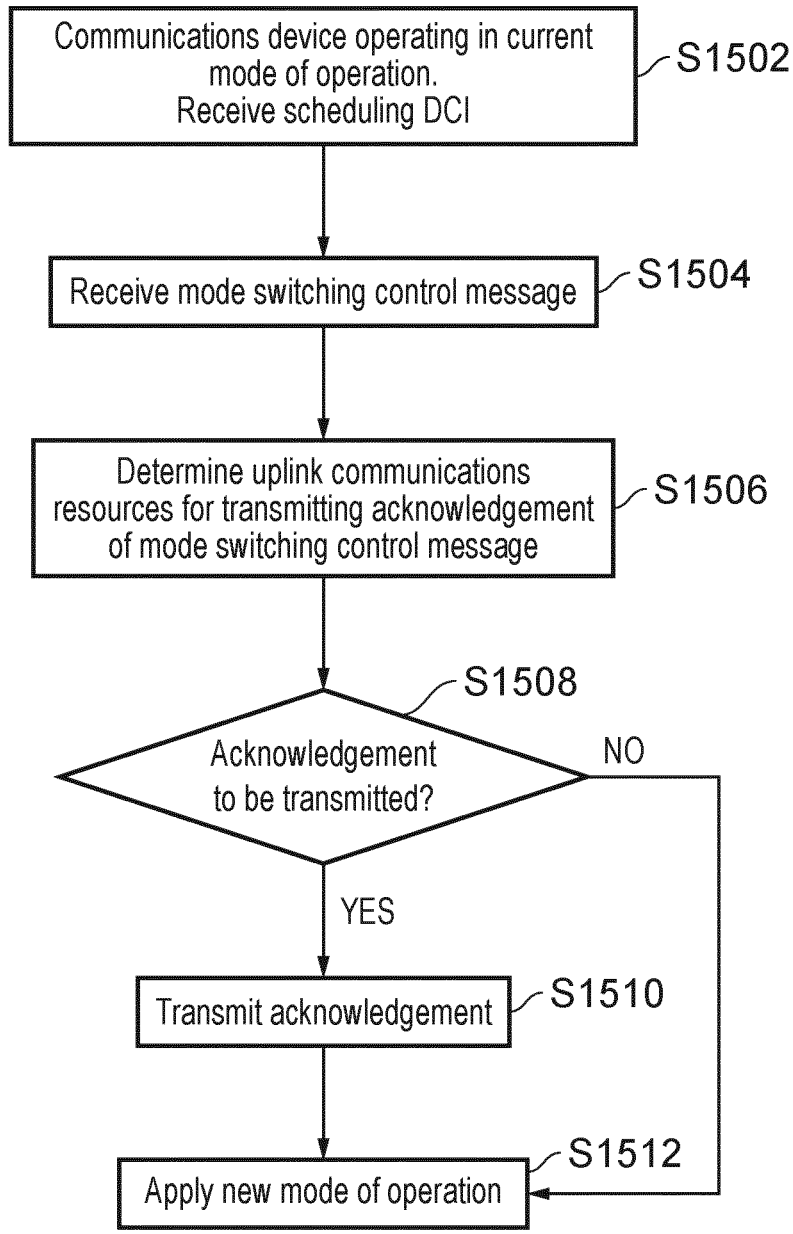
FIG. 5 is a flow chart for a process which may be carried out by a communications device in accordance with embodiments of the present technique.

FIG. 5 illustrates a process for the communications device 270 in accordance with embodiments of the present technique.

The process of FIG. 5 starts at step S1502, in which the communications device 270 is operating in a current mode of operation relating to restraints on the scheduling of the downlink or uplink communications resources. For example, the current mode of operation may be a cross-slot scheduling mode, or a same slot scheduling mode, as described above.

In step S1502, the communications device 270 receives a scheduling DCI during a first timeslot. The scheduling DCI comprises an indication of downlink or uplink communications resources, which may be indicated by means of an index to a predetermined TDRA table, as described above.

The communications device 270 may process the scheduling DCI in a conventional manner, in accordance with its current mode of operation.

In step S1504, the communications device receives a mode switching control message. A mode switching DCI as described above is an example of a mode switching control message. The mode switching control message indicates that the current mode of operation of the communications device is to be changed in a semi-static manner, i.e. until a further mode switching control message is received.

In step S1506, the communications device determines uplink communications resources (referred to herein as acknowledgement communications resources) allocated for a transmission of an acknowledgement of the mode switching control message. As described above, the acknowledgement communications resources may be determined based on RRC signalling, or based on an indication within the mode switching control message.

In step S1508, the communications device determines whether an acknowledgement is to be transmitted in response to receiving the mode switching control message. As described above, in some embodiments for example, an acknowledgement is only transmitted if the failure to receive the mode switching control message would have resulted in a critical misalignment.

In some embodiments, an acknowledgement is transmitted if failure to receive the mode switching control message would have resulted in adverse operation. For example, if the mode switching control message was a semi-static mode change message described in Table 2 above, then it is determined that an acknowledgement is to be transmitted.

If it is determined at step S1508 that an acknowledgement is to be transmitted in response to receiving the mode switching control message, then control passes to step S1510, in which the acknowledgement is transmitted, the acknowledgement using the acknowledgement communications resources. Control passes to step S1512.

If it is determined at step S1508 that no acknowledgement is to be transmitted, then control passes to step S1512.

In step S1512, the communications device 270 applies the mode of operation indicated by the mode switching control message. Accordingly, subsequent scheduling DCIs are processed in accordance with the new mode of operation, until a further mode switching control message is received.

Figure 6:
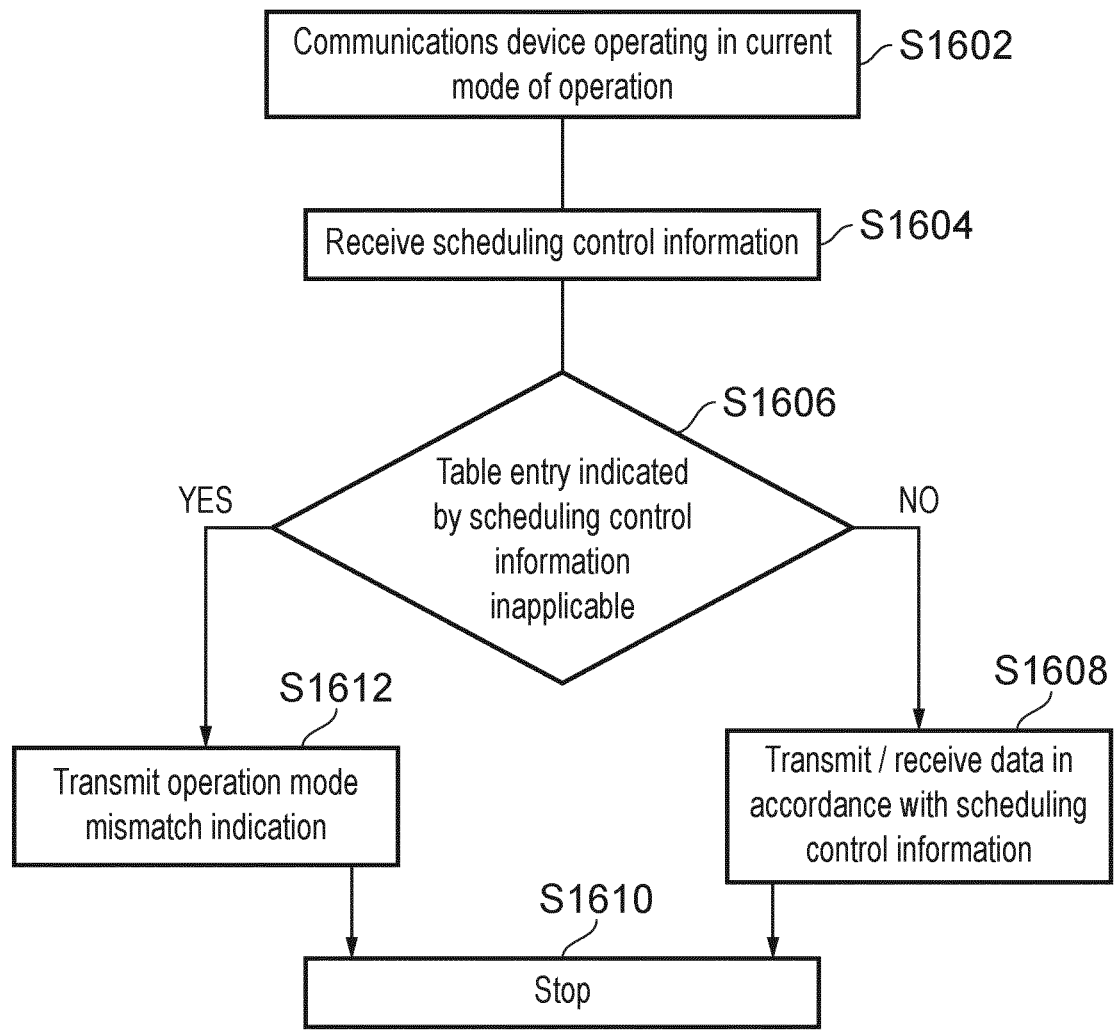
FIG. 6 is a flow chart for a further process which may be carried out by a communications device in accordance with embodiments of the present technique.

FIG. 6 illustrates a further process for the communications device 270 in accordance with embodiments of the present technique.

The process of FIG. 6 starts at step S1602, in which the communications device 270 is operating in a current mode of operation relating to restraints on the scheduling of the downlink or uplink communications resources. For example, the current mode of operation may be a cross-slot scheduling mode, or a same slot scheduling mode, as described above.

In step S1604, the communications device 270 receives a scheduling DCI during a first timeslot. The scheduling DCI comprises an indication of downlink or uplink communications resources by means of an index to a predetermined TDRA table, as described above.

In step S1606, the communications device 270 determines whether the indicated entry is associated with allocated communications resources of the shared channel which cannot be validly allocated in a current mode of operation. In other words, as described above, the communications device 270 determines whether, in the current mode of operation (either cross-slot or same slot scheduling) the index indicated by the scheduling DCI is inapplicable.

If at step S1606, the indicated entry is determined to be applicable (i.e. indicates communications resources which are compliant with the current mode of operation of the communications device) then control passes to step S1608.

In step S1608, the communications device 270 either transmits or receives data using the communications resources indicated by the TDRA table row corresponding to the indicated index. Control then passes to step S1610.

If at step S1606, the indicated entry is determined not to be applicable (i.e. indicates communications resources which are not compliant with the current mode of operation of the communications device) then control passes to step S1612.

In step S1612 the communications device transmits an operation mode mismatch indication, the operation mode mismatch indication indicating that the scheduling control information comprised an indication of an entry of a table corresponding to communications resources of the shared channel which cannot be validly allocated in the current mode of operation.

Control then passes to step S1610 and the process ends.

Thus there has been described a method of receiving data by a communications device in a wireless communications network, the method comprising receiving a downlink control message transmitted in first downlink communications resources of a wireless access interface provided by the wireless communications network, the downlink control message providing an indication of second downlink communications resources from which the communications device can receive downlink data, and receiving the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, the method comprising receiving a mode switching control message, the mode switching control message indicating that a mode of operation of the communications device is to be changed from one of the first reception mode and the second reception mode to the other of the first reception mode and the second reception mode until another mode switching control message is received, and transmitting one or more signals to confirm a current mode of operation, wherein the transmitting the one or more signals to confirm the current mode of operation comprises: determining uplink communications resources allocated for a transmission of an acknowledgement of the mode switching control message, determining that the acknowledgement is to be transmitted in response to receiving the mode switching control message, and transmitting the acknowledgement using the allocated uplink communications resources.

There has also been described a method of receiving data by a communications device in a wireless communications network, the method comprising receiving a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, receiving a downlink control message transmitted in first downlink communications resources of a wireless access interface provided by the wireless communications network, the downlink control message providing an indication of second downlink communications resources from which the communications device can receive the downlink data, the downlink control message comprising an indication of an entry in a predetermined table of entries for indicating that the second downlink communications resources of a shared channel are allocated to the communications device, determining that the indicated entry is associated with allocated communications resources of the shared channel which cannot be validly allocated in a current mode of operation of one of the first reception mode and the second reception mode, and in response to determining that the indicated entry is associated with allocated communications resources of the shared channel which cannot be validly allocated in the current mode of operation, performing an operation which indicates to the wireless communications network that there is a mismatch between the current mode of operation and the mode of operation of the communications device expected by the wireless communications network.

Corresponding communications devices, infrastructure equipment and methods therefore, and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type of communications device operating with a wireless link to the communication network.

It will further be appreciated that the principles described herein are not applicable only to LTE-based wireless telecommunications systems, but are applicable for any type of wireless telecommunications system that supports control of semi-static modes of operation of a communications device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of receiving data by a communications device in a wireless communications network, the method comprising receiving a downlink control message transmitted in first downlink communications resources of a wireless access interface provided by the wireless communications network, the downlink control message providing an indication of second downlink communications resources from which the communications device can receive downlink data, and receiving the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, the method comprising receiving a mode switching control message, the mode switching control message indicating that a mode of operation of the communications device is to be changed from one of the first reception mode and the second reception mode to the other of the first reception mode and the second reception mode until another mode switching control message is received, and transmitting one or more signals to confirm a current mode of operation, wherein the transmitting the one or more signals to confirm the current mode of operation comprises: determining uplink communications resources allocated for a transmission of an acknowledgement of the mode switching control message, determining that the acknowledgement is to be transmitted in response to receiving the mode switching control message, and transmitting the acknowledgement using the allocated uplink communications resources.

Paragraph 2. A method according to paragraph 1, wherein the wireless access interface includes a time divided structure comprising communications resources divided into time divided units and the first reception mode is a cross-slot scheduling mode in which the first downlink communications resources are in a first time unit and the second downlink communications resources are in a second time unit later than the first time unit, and the second reception mode is a same-slot scheduling mode in which the first downlink communications resources can be in the same time unit as the second downlink communications resources.

Paragraph 3. A method according to paragraph 2, wherein in the first reception mode, the communications device is configured to disable a receiver for receiving downlink data after receiving the downlink control message in the first downlink communications resources and before the end of the first time unit.

Paragraph 4. A method according to any of paragraphs 2 to 4 wherein determining that the acknowledgement is to be transmitted in response to receiving the mode switching control message comprises determining that a current mode of operation is the cross-slot scheduling mode, and the mode switching control message indicates that the mode of operation is to be changed to the same-slot scheduling mode.

Paragraph 5. A method according to any of paragraphs 1 to 4, wherein determining that the acknowledgement is to be transmitted in response to receiving the mode switching control message comprises determining that the mode switching control message comprises an indication that an acknowledgement is to be transmitted if the mode switching control message is successfully received.

Paragraph 6. A method according to any of paragraphs 1 to 5, wherein the allocated uplink communications resources are on a physical uplink control channel (PUCCH).

Paragraph 7. A method according to any of paragraphs 1 to 6, wherein the determined uplink communications resources are determined based on communications resources used for the transmission of the mode switching control message.

Paragraph 8. A method according to any of paragraphs 1 to 7, wherein the communications resources of the wireless access interface are divided in time into time units, each time unit comprising a plurality of orthogonal frequency division multiplexing (OFDM) symbol periods, the mode switching control message comprises one or more of an indication of a time duration, an indication of a time unit and an indication of a number of orthogonal frequency division multiplexing (OFDM) symbol periods, and the allocated uplink communications resources are determined based on the one or more of the indication of the time duration, the indication of the time unit and the indication of the number of OFDM symbol periods.

Paragraph 9. A method according to any of paragraphs 1 to 8, wherein the mode switching control message is transmitted in downlink control information on a physical downlink control channel.

Paragraph 10. A method according to any of paragraphs 1 to 9, wherein determining that the acknowledgement is to be transmitted in response to receiving the mode switching control message comprises determining that the mode switching control message indicates that the mode of operation of the communications device is to be changed from a current reception mode to a new reception mode and determining that the communications device, when operating in accordance with the current reception mode cannot receive the downlink data transmitted using the new reception mode.

Paragraph 11. A method according to any of paragraphs 1 to 10, wherein determining that the acknowledgement is to be transmitted in response to receiving the mode switching control message comprises determining that the mode switching control message indicates one or more of a Wake-up outside active time, a Wake-up inside active time, enabling cross slot scheduling, a change from single cell operation to multi-cell operation or vice versa, a change in bandwidth part, a change in secondary cell, a change in multiple input/multiple output (MIMO) layer adaptation, a change of CORESET/search/space/candidate for subsequent PDCCH decoding, a change of PDCCH monitoring periodicity, a semi-persistent scheduling (SPS) activation, and a change of discontinuous reception (DRX) configuration.

Paragraph 12. A method of receiving data by a communications device in a wireless communications network, the method comprising receiving a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, receiving a downlink control message transmitted in first downlink communications resources of a wireless access interface provided by the wireless communications network, the downlink control message providing an indication of second downlink communications resources from which the communications device can receive the downlink data, the downlink control message comprising an indication of an entry in a predetermined table of entries for indicating that the second downlink communications resources of a shared channel are allocated to the communications device, determining that the indicated entry is associated with allocated communications resources of the shared channel which cannot be validly allocated in a current mode of operation of one of the first reception mode and the second reception mode, and in response to determining that the indicated entry is associated with allocated communications resources of the shared channel which cannot be validly allocated in the current mode of operation, performing an operation which indicates to the wireless communications network that there is a mismatch between the current mode of operation and the mode of operation of the communications device expected by the wireless communications network.

Paragraph 13. A method according to paragraph 12, wherein the operation which indicates to the wireless communications network that there is a mismatch comprises transmitting an operation mode mismatch indication, the operation mode mismatch indication indicating that the scheduling control information comprised an indication of an entry of a table corresponding to communications resources of the shared channel which cannot be validly allocated in the current mode of operation.

Paragraph 14. A method according to paragraph 12, wherein the scheduling control information comprised an indication of a table corresponding to communications resources of the shared channel, and the operation which indicates to the wireless communications network that there is a mismatch comprises transmitting an operation mode mismatch indication, the operation mode mismatch indication indicating that the table differs from the table used by the communications device in the current mode of operation.

15. A method according to paragraph 13 or paragraph 14, wherein transmitting the operation mode mismatch indication comprises transmitting a radio resource control (RRC) message comprising the operation mode mismatch indication.

Paragraph 16. A method according to paragraph 13 or paragraph 14, wherein transmitting the operation mode mismatch indication comprises transmitting the operation mode mismatch indication using communications resources allocated for transmitting hybrid automatic repeat request (HARQ) feedback.

Paragraph 17. A method according to paragraph 13 or paragraph 14, wherein transmitting the operation mode mismatch indication comprises transmitting a predetermined preamble sequence on a random access channel.

Paragraph 18. A method according to paragraph 12, wherein the operation which indicates to the wireless communications network that there is a mismatch comprises refraining from transmitting using the allocated uplink communications resources.

Paragraph 19. A method according to paragraph 1, wherein the transmitting the current mode of operation comprises: determining uplink communications resources allocated for a transmission of acknowledgement information relating to the downlink data, and transmitting using the uplink communications resources an indication of a current mode of operation of the communications device.

Paragraph 20. A method according to paragraph 19, wherein transmitting using the uplink communications resources the indication of the current mode of operation of the communications device comprises transmitting acknowledgement information scrambled in accordance with a predetermined scrambling sequence associated with the current mode of operation of the communications device.

Paragraph 21. A method according to paragraph 1, the method comprising in response to receiving the mode switching control message, updating a change of operation mode count value, wherein the transmitting the current mode of operation comprises: determining uplink communications resources allocated for a transmission of acknowledgement information relating to the downlink data, and transmitting using the uplink communications resources an indication of the change of operation mode count value.

Paragraph 22. A method according to paragraph 21, wherein the updating the change of operation mode count value is carried out using modulo two arithmetic.

Paragraph 23. A method according to paragraph 21 or paragraph 22, wherein transmitting using the uplink communications resources the indication of the change of operation mode count value comprises transmitting acknowledgement information scrambled in accordance with a predetermined scrambling sequence associated with the change of operation mode count value.

Paragraph 24. A method of transmitting data to a communications device in a wireless communications network, the method comprising transmitting a downlink control message in first downlink communications resources of a wireless access interface provided by the wireless communications network, the downlink control message providing an indication of second downlink communications resources from which the communications device can receive downlink data, transmitting the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, transmitting a mode switching control message, the mode switching control message indicating that a mode of operation of the communications device is to be changed from one of the first reception mode and the second reception mode to the other of the first reception mode and the second reception mode until another mode switching control message is received, and receiving one or more signals to confirm a current mode of operation, wherein the receiving the one or more signals comprises: determining uplink communications resources allocated for a transmission of an acknowledgement of the mode switching control message by the communications device, determining that the acknowledgement is to be transmitted in response to receiving the mode switching control message, and receiving the acknowledgement using the allocated uplink communications resources.

Paragraph 25. A method of transmitting data to a communications device in a wireless communications network, the method comprising transmitting a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, transmitting a downlink control message transmitted in first downlink communications resources of a wireless access interface provided by the wireless communications network, the downlink control message providing an indication of second downlink communications resources from which the communications device can receive the downlink data, the downlink control message comprising an indication of an entry in a predetermined table of entries for indicating that the second downlink communications resources of a shared channel are allocated to the communications device, transmitting the downlink data from the second downlink communications resources, determining that the communications device has performed an operation which indicates to the wireless communications network that there is a mismatch between a current mode of operation of one of the first reception mode and the second reception mode, and the mode of operation of the communications device expected by the wireless communications network, and in response to determining that the communications device has performed the operation, determining that the indicated entry is associated with allocated communications resources of the shared channel which cannot be validly allocated in the current mode of operation.

Paragraph 26. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to receive a downlink control message transmitted in first downlink communications resources of the wireless access interface, the downlink control message providing an indication of second downlink communications resources from which the communications device can receive downlink data, to receive the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, to receive a mode switching control message, the mode switching control message indicating that a mode of operation of the communications device is to be changed from one of the first reception mode and the second reception mode to the other of the first reception mode and the second reception mode until another mode switching control message is received, and to transmit one or more signals to confirm a current mode of operation, by determining uplink communications resources allocated for a transmission of an acknowledgement of the mode switching control message, determining that the acknowledgement is to be transmitted in response to receiving the mode switching control message, and transmitting the acknowledgement using the allocated uplink communications resources.

Paragraph 27. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive a downlink control message transmitted in first downlink communications resources of the wireless access interface, the downlink control message providing an indication of second downlink communications resources from which the communications device can receive downlink data, to receive the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, to receive a mode switching control message, the mode switching control message indicating that a mode of operation of the communications device is to be changed from one of the first reception mode and the second reception mode to the other of the first reception mode and the second reception mode until another mode switching control message is received, and to transmit one or more signals to confirm a current mode of operation, by determining uplink communications resources allocated for a transmission of an acknowledgement of the mode switching control message, determining that the acknowledgement is to be transmitted in response to receiving the mode switching control message, and transmitting the acknowledgement using the allocated uplink communications resources.

Paragraph 28. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to receive a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, to receive a downlink control message transmitted in first downlink communications resources of the wireless access interface, the downlink control message providing an indication of second downlink communications resources from which the communications device can receive the downlink data, the downlink control message comprising an indication of an entry in a predetermined table of entries for indicating that the second downlink communications resources of a shared channel are allocated to the communications device, to determine that the indicated entry is associated with allocated communications resources of the shared channel which cannot be validly allocated in a current mode of operation of one of the first reception mode and the second reception mode, and in response to determining that the indicated entry is associated with allocated communications resources of the shared channel which cannot be validly allocated in the current mode of operation, to perform an operation which indicates to the wireless communications network that there is a mismatch between the current mode of operation and the mode of operation of the communications device expected by the wireless communications network.

Paragraph 29. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, to receive a downlink control message transmitted in first downlink communications resources of the wireless access interface, the downlink control message providing an indication of second downlink communications resources from which the communications device can receive the downlink data, the downlink control message comprising an indication of an entry in a predetermined table of entries for indicating that the second downlink communications resources of a shared channel are allocated to the communications device, to determine that the indicated entry is associated with allocated communications resources of the shared channel which cannot be validly allocated in a current mode of operation of one of the first reception mode and the second reception mode, and in response to determining that the indicated entry is associated with allocated communications resources of the shared channel which cannot be validly allocated in the current mode of operation, to perform an operation which indicates to the wireless communications network that there is a mismatch between the current mode of operation and the mode of operation of the communications device expected by the wireless communications network.

Paragraph 30. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit a downlink control message in first downlink communications resources of the wireless access interface, the downlink control message providing an indication of second downlink communications resources from which the communications device can receive downlink data, to transmit the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, to transmit a mode switching control message, the mode switching control message indicating that a mode of operation of the communications device is to be changed from one of the first reception mode and the second reception mode to the other of the first reception mode and the second reception mode until another mode switching control message is received, and to receive one or more signals to confirm a current mode of operation, wherein the receiving the one or more signals comprises: determining uplink communications resources allocated for a transmission of an acknowledgement of the mode switching control message by the communications device, determining that the acknowledgement is to be transmitted in response to receiving the mode switching control message, and receiving the acknowledgement using the allocated uplink communications resources.

Paragraph 31. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit a downlink control message in first downlink communications resources of the wireless access interface, the downlink control message providing an indication of second downlink communications resources from which the communications device can receive downlink data, to transmit the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, to transmit a mode switching control message, the mode switching control message indicating that a mode of operation of the communications device is to be changed from one of the first reception mode and the second reception mode to the other of the first reception mode and the second reception mode until another mode switching control message is received, and to receive one or more signals to confirm a current mode of operation, wherein the receiving the one or more signals comprises: determining uplink communications resources allocated for a transmission of an acknowledgement of the mode switching control message by the communications device, determining that the acknowledgement is to be transmitted in response to receiving the mode switching control message, and receiving the acknowledgement using the allocated uplink communications resources.

Paragraph 32. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, to transmit a downlink control message transmitted in first downlink communications resources of the wireless access interface, the downlink control message providing an indication of second downlink communications resources from which the communications device can receive the downlink data, the downlink control message comprising an indication of an entry in a predetermined table of entries for indicating that the second downlink communications resources of a shared channel are allocated to the communications device, to transmit the downlink data from the second downlink communications resources, to determine that the communications device has performed an operation which indicates to the wireless communications network that there is a mismatch between a current mode of operation of one of the first reception mode and the second reception mode, and the mode of operation of the communications device expected by the wireless communications network, and in response to determining that the communications device has performed the operation, to determine that the indicated entry is associated with allocated communications resources of the shared channel which cannot be validly allocated in the current mode of operation.

Paragraph 33. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, to transmit a downlink control message transmitted in first downlink communications resources of the wireless access interface, the downlink control message providing an indication of second downlink communications resources from which the communications device can receive the downlink data, the downlink control message comprising an indication of an entry in a predetermined table of entries for indicating that the second downlink communications resources of a shared channel are allocated to the communications device, to transmit the downlink data from the second downlink communications resources, to determine that the communications device has performed an operation which indicates to the wireless communications network that there is a mismatch between a current mode of operation of one of the first reception mode and the second reception mode, and the mode of operation of the communications device expected by the wireless communications network, and in response to determining that the communications device has performed the operation, to determine that the indicated entry is associated with allocated communications resources of the shared channel which cannot be validly allocated in the current mode of operation.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009
[3] 3GPP TS 38.321, "Medium Access Control (MAC) protocol specification (Rel-15)", v15.3.0
[4] 3GPP TS 38.214 "NR; Physical layer procedures for data (Release 15)", version 15.2.0
[5] 3GPP TS 38.300 v. 15.4.0 "NR; NR and NG-RAN Overall Description; Stage 2 (Release 15)"

[6] 3GPP TS 38.825
[7] RP-190727, "New WID: UE Power Saving in NR", CATT, CAICT, 3GPP RAN #83
[8] R1-1211282, Qualcomm, 3GPP RAN1 #94bis, Chengdu, October 2018
[9] Co-pending European Application number EP19172640.5

What is claimed is:

1. A method of receiving data by a communications device in a wireless communications network, the method comprising
   receiving a downlink control message transmitted in first downlink communications resources of a wireless access interface provided by the wireless communications network, the downlink control message providing an indication of second downlink communications resources from which the communications device is configured to receive downlink data, and
   receiving the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, the method comprising
   receiving a mode switching control message, the mode switching control message indicating that a mode of operation of the communications device is to be changed from one of the first reception mode and the second reception mode to the other of the first reception mode and the second reception mode until another mode switching control message is received, and
   transmitting one or more signals to confirm a current mode of operation, wherein the transmitting the one or more signals to confirm the current mode of operation comprises:
   determining uplink communications resources allocated for a transmission of an acknowledgement of the mode switching control message,
   determining that the acknowledgement is to be transmitted in response to receiving the mode switching control message, and
   transmitting the acknowledgement using the allocated uplink communications resources.

2. The method of claim 1, wherein the wireless access interface includes a time divided structure comprising communications resources divided into time divided units and the first reception mode is a cross-slot scheduling mode in which the first downlink communications resources are in a first time unit and the second downlink communications resources are in a second time unit later than the first time unit, and the second reception mode is a same-slot scheduling mode in which at least a portion of the first downlink communications resources are in the same time unit as the second downlink communications resources.

3. The method of claim 2, wherein in the first reception mode, the communications device is configured to disable a receiver for receiving downlink data after receiving the downlink control message in the first downlink communications resources and before the end of the first time unit.

4. The method of claim 2, wherein determining that the acknowledgement is to be transmitted in response to receiving the mode switching control message comprises determining that a current mode of operation is the cross-slot scheduling mode, and the mode switching control message indicates that the mode of operation is to be changed to the same-slot scheduling mode.

5. The method of claim 1, wherein determining that the acknowledgement is to be transmitted in response to receiving the mode switching control message comprises determining that the mode switching control message comprises an indication that an acknowledgement is to be transmitted if the mode switching control message is successfully received.

6. The method of claim 1, wherein the allocated uplink communications resources are on a physical uplink control channel (PUCCH).

7. The method of claim 1, wherein the determined uplink communications resources are determined based on communications resources used for the transmission of the mode switching control message.

8. The method of claim 1, wherein the communications resources of the wireless access interface are divided in time into time units, each time unit comprising a plurality of orthogonal frequency division multiplexing (OFDM) symbol periods,
   the mode switching control message comprises one or more of an indication of a time duration, an indication of a time unit and an indication of a number of orthogonal frequency division multiplexing (OFDM) symbol periods, and
   the allocated uplink communications resources are determined based on the one or more of the indication of the time duration, the indication of the time unit and the indication of the number of OFDM symbol periods.

9. The method of claim 1, wherein the mode switching control message is transmitted in downlink control information on a physical downlink control channel.

10. The method of claim 1, wherein determining that the acknowledgement is to be transmitted in response to receiving the mode switching control message comprises determining that the mode switching control message indicates that the mode of operation of the communications device is to be changed from a current reception mode to a new reception mode, and
    determining that the communications device, when operating in accordance with the current reception mode cannot receive the downlink data transmitted using the new reception mode.

11. The method of claim 1, wherein determining that the acknowledgement is to be transmitted in response to receiving the mode switching control message comprises determining that the mode switching control message indicates one or more of a Wake-up outside active time, a Wake-up inside active time, enabling cross slot scheduling, a change from single cell operation to multi-cell operation or vice versa, a change in bandwidth part, a change in secondary cell, a change in multiple input/multiple output (MIMO) layer adaptation, a change of CORESET/search/space/candidate for subsequent PDCCH decoding, a change of PDCCH monitoring periodicity, a semi-persistent scheduling (SPS) activation, and a change of discontinuous reception (DRX) configuration.

12. A method of receiving data by a communications device in a wireless communications network, the method comprising
    receiving a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, receiving a downlink control message transmitted in first downlink communications resources of a wireless access interface provided by the wireless communications network, the downlink control message providing an indication of second downlink communications resources from which the communications device is configured to receive the downlink data, the downlink control message comprising an indication of an entry in a predetermined table of entries for indicating that the second downlink communications resources of a shared channel are allocated to the communications device, determining that the indicated entry is associated with allocated communications resources of the shared channel which cannot be validly allocated in a current mode of operation of one of the first reception mode and the second reception mode, and in response to determining that the indicated entry is associated with allocated communications resources of the shared channel which cannot be validly allocated in the current mode of operation, performing an operation which indicates to the wireless communications network that there is a mismatch between the current mode of operation and the mode of operation of the communications device expected by the wireless communications network.

13. The method of claim 12, wherein the operation which indicates to the wireless communications network that there is a mismatch comprises transmitting an operation mode mismatch indication, the operation mode mismatch indication indicating that the scheduling control information comprised an indication of an entry of a table corresponding to communications resources of the shared channel which cannot be validly allocated in the current mode of operation.

14. The method of claim 12, wherein the scheduling control information comprised an indication of a table corresponding to communications resources of the shared channel, and the operation which indicates to the wireless communications network that there is a mismatch comprises transmitting an operation mode mismatch indication, the operation mode mismatch indication indicating that the table differs from the table used by the communications device in the current mode of operation.

15. The method of claim 13, wherein transmitting the operation mode mismatch indication comprises transmitting a radio resource control (RRC) message comprising the operation mode mismatch indication.

16. The method of claim 13, wherein transmitting the operation mode mismatch indication comprises transmitting the operation mode mismatch indication using communications resources allocated for transmitting hybrid automatic repeat request (HARQ) feedback.

17. The method of claim 1, wherein the transmitting the current mode of operation comprises:

determining uplink communications resources allocated for a transmission of acknowledgement information relating to the downlink data, and transmitting using the uplink communications resources an indication of a current mode of operation of the communications device.

18. The method of claim 1, the method comprising in response to receiving the mode switching control message, updating a change of operation mode count value, wherein the transmitting the current mode of operation comprises:

determining uplink communications resources allocated for a transmission of acknowledgement information relating to the downlink data, and transmitting using the uplink communications resources an indication of the change of operation mode count value.

19. A method of transmitting data to a communications device in a wireless communications network, the method comprising transmitting a downlink control message in first downlink communications resources of a wireless access interface provided by the wireless communications network, the downlink control message providing an indication of second downlink communications resources from which the communications device is configured to receive downlink data, transmitting the downlink data from the second downlink communications resources, wherein the communications device is configured to operate in a first reception mode in which a receiver of the communications device is configured to receive the downlink data transmitted according to a first format via the second downlink communications resources, or to operate in a second reception mode in which the receiver of the communications device is configured to receive the downlink data transmitted according to a second format via the second downlink communications resources, transmitting a mode switching control message, the mode switching control message indicating that a mode of operation of the communications device is to be changed from one of the first reception mode and the second reception mode to the other of the first reception mode and the second reception mode until another mode switching control message is received, and receiving one or more signals to confirm a current mode of operation, wherein the receiving the one or more signals comprises:

determining uplink communications resources allocated for a transmission of an acknowledgement of the mode switching control message by the communications device, determining that the acknowledgement is to be transmitted in response to receiving the mode switching control message, and receiving the acknowledgement using the allocated uplink communications resources.

20. A method of transmitting data to a communications device in a wireless communications network, the method comprising transmitting a mode switching control message, the mode switching control message indicating that a mode of operation of the communications device is to be changed from one of a first reception mode and a second reception mode to the other of the first reception mode and the second reception mode until another mode switching control message is received, wherein the communications device is configured to operate in the first reception mode in which a receiver of the communications device is configured to receive downlink data transmitted according to a first format or to operate in the second reception mode in which the receiver of the communications device is configured to receive the downlink data transmitted according to a second format, transmitting a downlink control message transmitted in first downlink communications resources of a wireless access interface provided by the wireless communications network, the downlink control message providing an indication of second downlink communications resources from which the communications device is configured to receive the downlink data, the downlink control message comprising an indication of an entry in a predetermined table of entries for indicating that the second downlink communications resources of a shared channel are allocated to the communications device, transmitting the downlink data from the second downlink communications resources, determining that the communications device has performed an operation which indicates to the wireless communications network that there is a mismatch between a current mode of operation of one of the first reception mode and the second reception mode, and the mode of operation of the communications device expected by the wireless communications network, and in response to determining that the communications device has performed the operation, determining that the indicated entry is associated with allocated communications resources of the shared channel which cannot be validly allocated in the current mode of operation.

\* \* \* \* \*